(12) United States Patent
Taylor

(10) Patent No.: US 11,512,611 B2
(45) Date of Patent: Nov. 29, 2022

(54) STATOR APPARATUS FOR A GAS TURBINE ENGINE

(71) Applicant: General Electric Company, Schenectady, NY (US)

(72) Inventor: Steven Mitchell Taylor, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/171,030

(22) Filed: Feb. 9, 2021

(65) Prior Publication Data
US 2022/0251968 A1   Aug. 11, 2022

(51) Int. Cl.
*F01D 25/24* (2006.01)
*F01D 9/04* (2006.01)

(52) U.S. Cl.
CPC .......... *F01D 25/246* (2013.01); *F01D 9/042* (2013.01); *F01D 9/044* (2013.01); *F01D 9/041* (2013.01); *F05D 2220/36* (2013.01); *F05D 2240/11* (2013.01); *F05D 2240/12* (2013.01); *F05D 2240/35* (2013.01); *F05D 2270/101* (2013.01)

(58) Field of Classification Search
CPC ........ F01D 25/246; F01D 9/042; F01D 9/044; F01D 9/041; F05D 2240/11; F05D 2240/12
See application file for complete search history.

(56) References Cited

U.S. PATENT DOCUMENTS

| | | | |
|---|---|---|---|
| 8,870,526 B2 * | 10/2014 | Bryk | F01D 9/041 415/116 |
| 9,289,826 B2 | 3/2016 | Morris et al. | |
| 9,822,654 B2 | 11/2017 | Brandl et al. | |
| 10,119,547 B2 * | 11/2018 | Rautenstrauch | F01D 25/243 |
| 10,202,858 B2 | 2/2019 | Wilber et al. | |
| 2006/0067815 A1 * | 3/2006 | Ghasripoor | F01D 11/16 415/170.1 |
| 2009/0047126 A1 * | 2/2009 | Ress, Jr. | F01D 9/041 415/209.3 |
| 2011/0146229 A1 | 6/2011 | Bajusz et al. | |
| 2011/0268580 A1 * | 11/2011 | Bryk | F01D 25/246 416/244 R |
| 2012/0275912 A1 * | 11/2012 | Moniz | F02C 9/18 415/199.5 |
| 2016/0130960 A1 | 5/2016 | Cortequisse | |
| 2017/0211405 A1 | 7/2017 | Sedlov et al. | |
| 2017/0218792 A1 | 8/2017 | Merkl | |
| 2017/0268537 A1 * | 9/2017 | Mielke | F01D 9/042 |
| 2018/0050392 A1 * | 2/2018 | Mason-Flucke | B22F 10/20 |
| 2018/0135517 A1 | 5/2018 | Mook et al. | |
| 2018/0216631 A1 * | 8/2018 | Thornton | F02C 7/36 |
| 2018/0313276 A1 * | 11/2018 | Taylor | F02C 6/08 |

* cited by examiner

*Primary Examiner* — Igor Kershteyn
*Assistant Examiner* — Brian Christopher Delrue
(74) *Attorney, Agent, or Firm* — Hanley, Flight & Zimmerman, LLC

(57) ABSTRACT

A turbomachinery stator apparatus includes: a compressor casing including a casing wall defining an arcuate flowpath surface and an opposed backside surface, the flowpath surface defining at least two spaced-apart rotor lands; and a stator vane row of stator vanes disposed inside the compressor casing; wherein the casing wall includes at least one hollow structure; and wherein the casing wall is a single monolithic whole, wherein the stator vanes are integrally formed as part of the monolithic whole.

20 Claims, 6 Drawing Sheets

STATOR APPARATUS FOR A GAS TURBINE ENGINE

BACKGROUND OF THE INVENTION

This invention relates generally to gas turbine engines, and more particularly relates to stator structures of such engines.

A gas turbine engine includes, in serial flow communication, a compressor, a combustor, and turbine. The turbine is mechanically coupled to the compressor and the three components define a turbomachinery core. The core is operable in a known manner to generate a flow of hot, pressurized combustion gases to operate the engine as well as perform useful work such as providing propulsive thrust or mechanical work.

Typically, the compressor has multiple stages and the static pressure at each subsequent stage is higher than the upstream stage, with the final stage discharging air at the intended compressor discharge pressure ("CDP").

The compressor includes a rotor rotating inside a stator structure comprising a casing and stator vanes which define the flowpath through the rotor.

There is a desire for stator structures that have a simple construction without many individual components. The attachment features needed for complex assemblies restricts the ability to optimize the design as it relates to control of rotor airfoil tip clearances, engine axial length, and efficient extraction of bleed air from the main flowpath for other uses.

BRIEF DESCRIPTION OF THE INVENTION

This need is addressed by a stator structure which incorporates one or more features into an integral whole with a compressor casing.

According to one aspect of the technology described herein, a turbomachinery stator apparatus includes: a compressor casing including a casing wall defining an arcuate flowpath surface and an opposed backside surface, the flowpath surface defining at least two spaced-apart rotor lands; and a stator vane row of stator vanes disposed inside the compressor casing; wherein the casing wall includes at least one hollow structure; and wherein the casing wall is a single monolithic whole.

According to another aspect of the technology described herein, a gas turbine engine apparatus includes: a compressor, a combustor, and a turbine arranged in serial flow relationship, wherein the compressor includes: a compressor casing including a casing wall defining an arcuate flowpath surface and an opposed backside surface, the flowpath surface defining at least two spaced-apart rotor lands; wherein the casing wall includes at least one hollow structure; and wherein the casing wall is a single monolithic whole; at least one row of stator vanes disposed inside the compressor casing; and at least one row of rotor blades mounted for rotation about a centerline axis inside the compressor casing, and mechanically coupled to the turbine.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
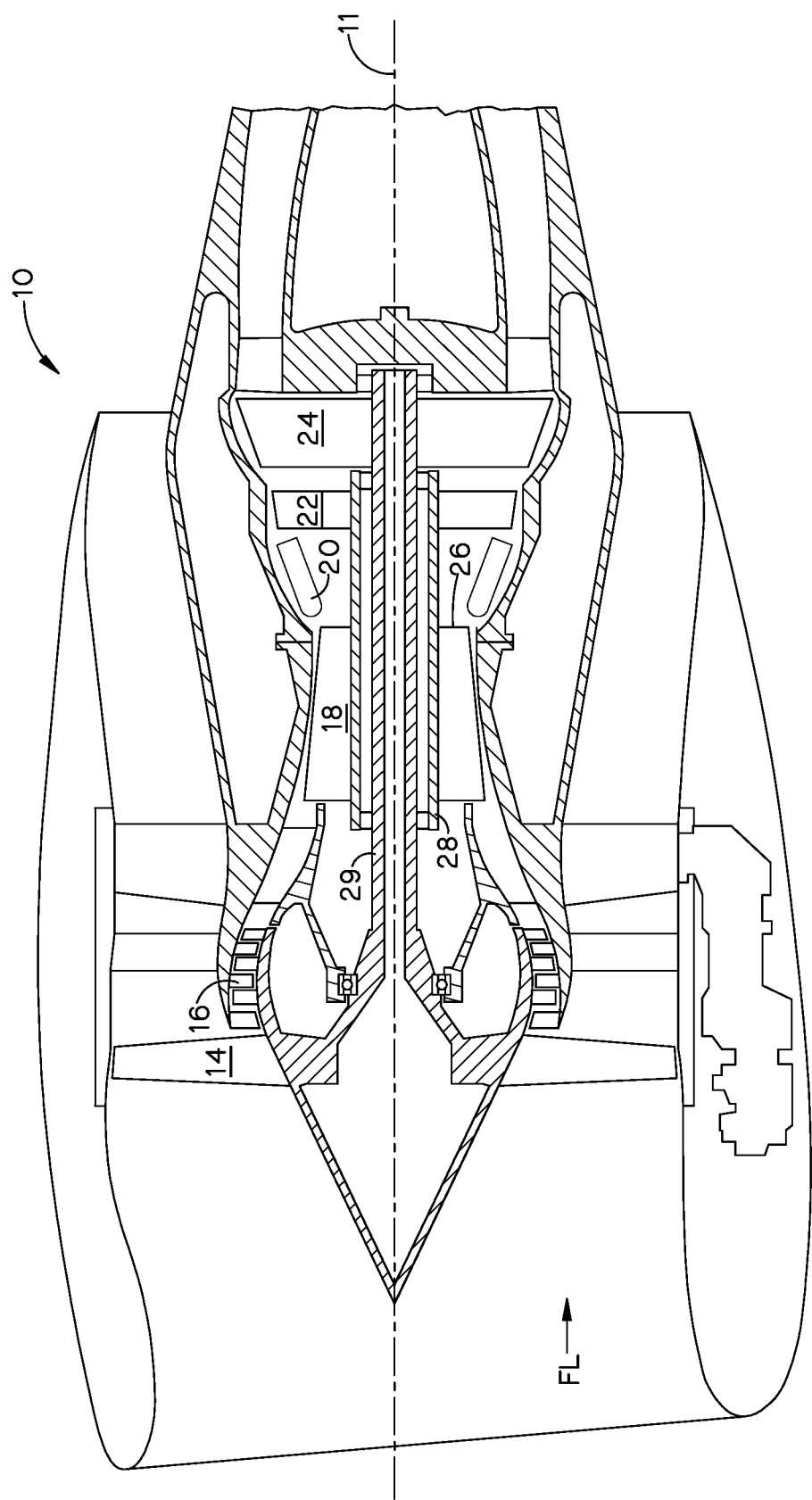
FIG. 1 is a cross-sectional, schematic view of a gas turbine engine that incorporates an integrated stator structure.

Referring to the drawings wherein identical reference numerals denote the same elements throughout the various views, FIG. 1 depicts an exemplary gas turbine engine 10. While the illustrated example is a high-bypass turbofan engine, the principles of the present invention are also applicable to other types of engines, such as low-bypass turbofans, turbojets, turboprops, etc., as well as turbine engines having any number of compressor-turbine spools. The principles of the present invention are also potentially applicable to other types of turbomachinery such as power-generating turbines, or compressors driven by separate prime movers.

The engine 10 has a longitudinal center line or axis 11. It is noted that, as used herein, the terms "axial" and "longitudinal" both refer to a direction parallel to the centerline axis 11, while "radial" refers to a direction perpendicular to the axial direction, and "tangential" or "circumferential" refers to a direction mutually perpendicular to the axial and radial directions. As used herein, the terms "forward" or "front" refer to a location relatively upstream in an air flow passing through or around a component, and the terms "aft" or "rear" refer to a location relatively downstream in an air flow passing through or around a component. The direction of this flow is shown by the arrow "FL" in FIG. 1. These directional terms are used merely for convenience in description and do not require a particular orientation of the structures described thereby.

The engine 10 has a fan 14, booster 16, high-pressure compressor or "HPC" 18, combustor 20, high pressure turbine or "HPT" 22, and low-pressure turbine or "LPT" 24 arranged in serial flow relationship. In operation, pressurized air from an exit 26 of the compressor 18 is mixed with fuel in the combustor 20 and ignited, thereby generating combustion gases. Some work is extracted from these gases by the high-pressure turbine 22 which drives the compressor 18 via an outer shaft 28. The combustion gases then flow into the low-pressure turbine 24, which drives the fan 14 and booster 16 via an inner shaft 29.

Figure 2:
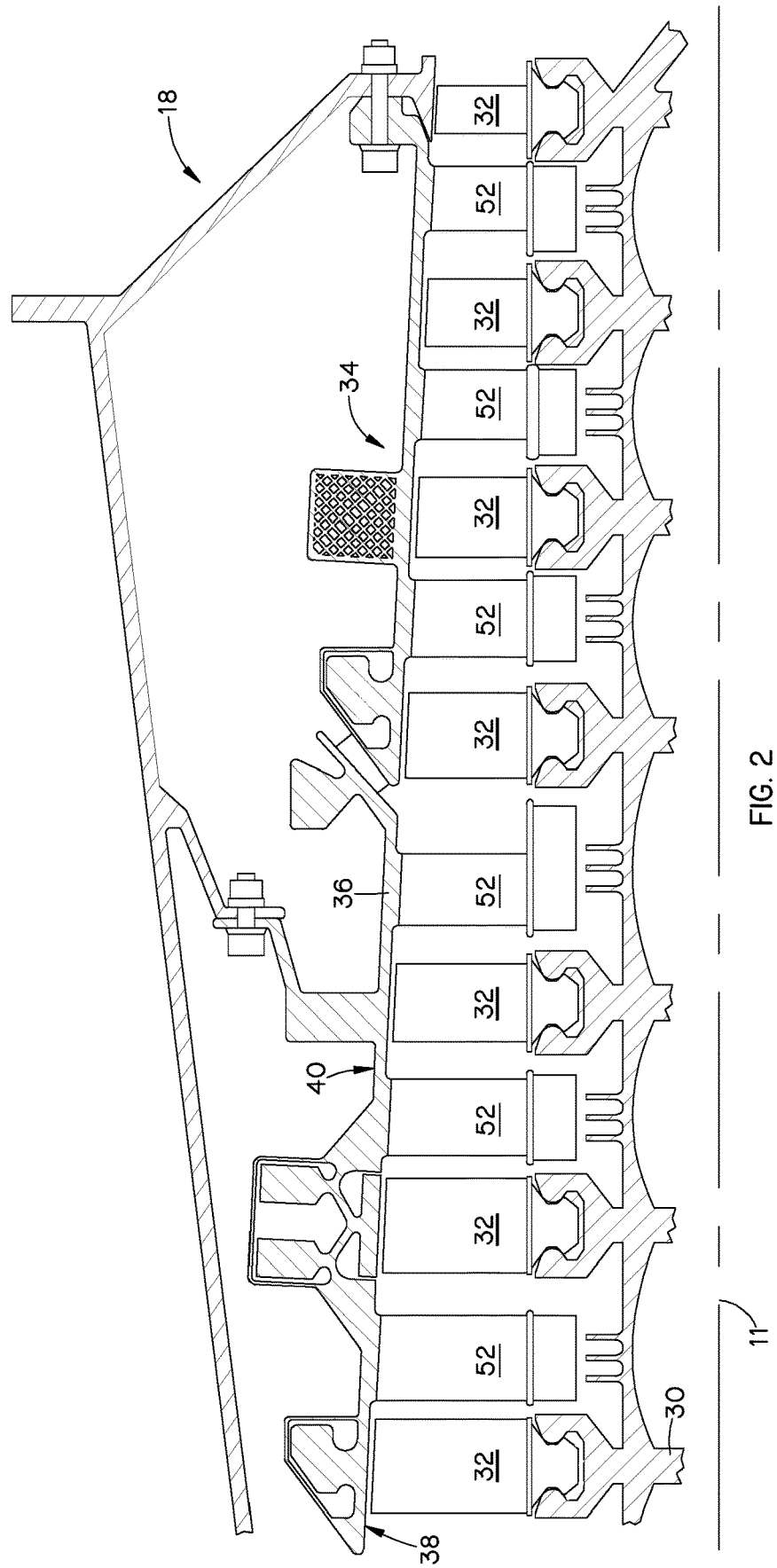
FIG. 2 is a schematic, half-sectional view of a portion of a compressor of the engine of FIG. 1.

FIG. 2 is a half-sectional view of a portion of the HPC 18 incorporating an exemplary embodiment of a stator structure. The HPC 18 is used as an example to illustrate the principles of the present invention. The illustrated stage-by-stage features are meant to show a portion of the range of design approaches enabled by the present invention. Different approaches and different materials, for example different metal alloys, could be used at different locations, e.g., at different stages of the compressor within the same axially-monolithic structure.

The HPC 18 includes a compressor rotor 30, rotatable about centerline axis 11, which is in turn mechanically coupled to the outer shaft 28 described above. The rotor includes a number of stages. Each stage includes a blade row of circumferentially-spaced airfoil-shaped rotor blades 32. As an example, a typical compressor could include 6-14 stages. In operation, the static air pressure is incrementally increased by each subsequent compressor stage, with the final stage discharging air at the intended compressor discharge pressure ("CDP") for subsequent flow into the combustor 20 (FIG. 1).

The compressor 18 is surrounded by a compressor casing 34 that supports stator vanes 52 described below. The compressor casing 34 comprises a casing wall 36 with an arcuate radially inboard surface 38 (also referred to as the flowpath surface) and an opposed radially outboard surface 40.

Figure 3:
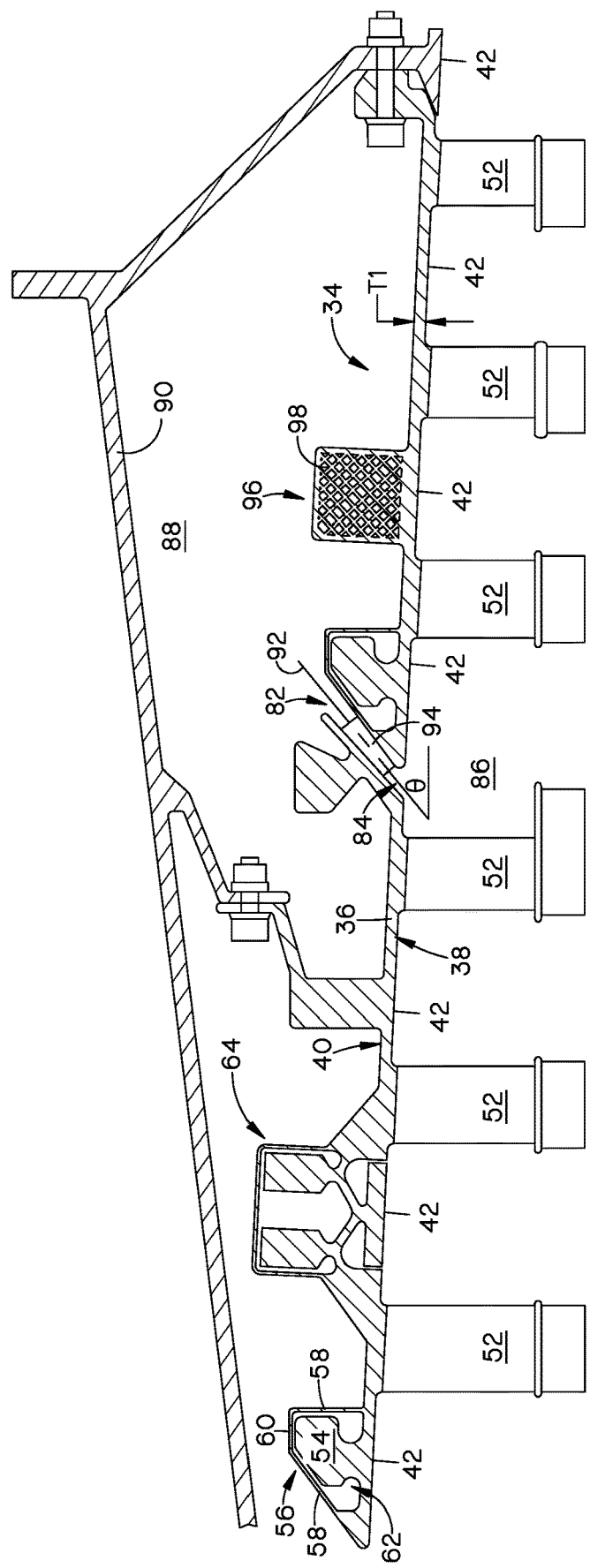
FIG. 3 is view of a stator structure shown in FIG. 2, with the rotor removed.

Referring to FIG. 3, the flowpath surface 38 defines two or more rotor lands 42, which are arcuate surfaces shaped and sized to closely surround the tips of the rotor blades 32. One rotor land 42 is positioned outboard of each row of rotor blades 32.

In the illustrated example, a single compressor casing 34 is provided which may extend over the entire length of the compressor. In this example, seven rotor blade rows are shown. It will be understood that the compressor casing could alternatively be configured as two or more sections arranged in series along the axial direction. For example, the compressor casing could include a forward section and aft section which would be joined together by a bolted joint or other similar arrangement. For the purposes of the present invention each of those sections would constitute a "compressor casing".

Figure 4:
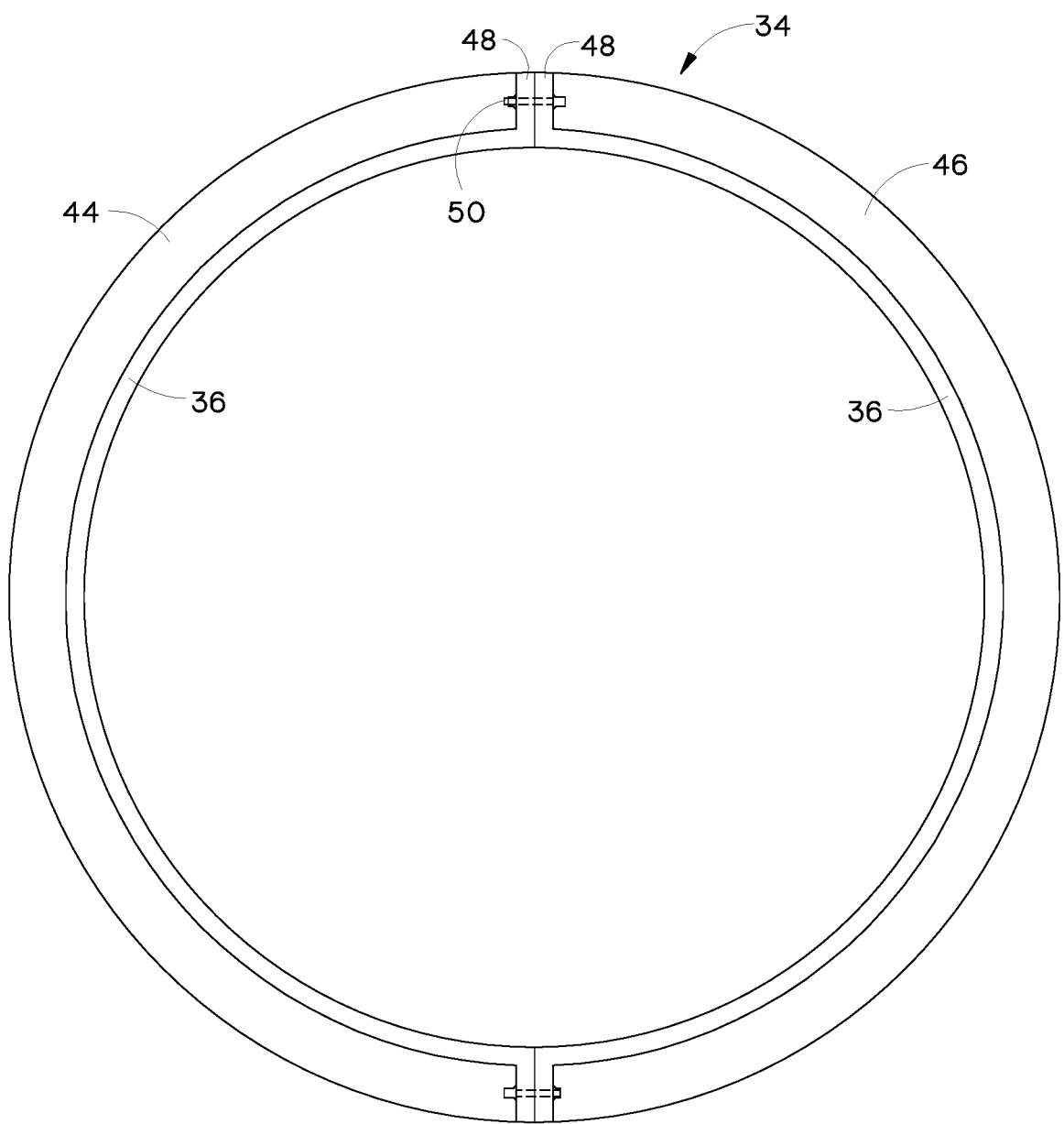
FIG. 4 is a front elevation view of a portion of the stator structure shown in FIG. 3.

As assembled in the engine 10, the compressor casing 34 is generally annular such that the flowpath surface 38 may be a body of revolution. In one exemplary configuration, the casing wall 36 may be a single unitary, integral, or monolithic annular structure defining the flowpath surface 38. Alternatively, the compressor casing 34 may be divided along one or more axial-radial planes to define segments which may be connected together. For example, FIG. 4 shows the compressor casing 34 being divided into left and right segments 44, 46, respectively each comprising an arcuate casing wall 36. Each of the segments 44, 46, respectively includes split line flanges 48 which abut each other. The split line flanges 48 are clamped together by conventional fasteners 50. While two segments are shown, it will be understood that the compressor casing 34 may be divided into any number of segments. It will be further understood that the split line flanges 48 may be located at any clock position relative to the compressor casing 34.

Each casing wall 36 may be a single unitary, one-piece, or monolithic component. The casing wall 36 may be manufactured using a manufacturing process which involves layer-by-layer construction or additive fabrication (as opposed to material removal as with conventional machining processes). Such processes may be referred to as "rapid manufacturing processes" and/or "additive manufacturing processes," with the term "additive manufacturing process" being term herein to refer generally to such processes. Additive manufacturing processes include, but are not limited to: Direct Metal Laser Melting (DMLM), Laser Net Shape Manufacturing (LNSM), electron beam sintering, Selective Laser Sintering (SLS), 3D printing, such as by inkjets and laserjets, Stereolithography (SLA), Electron Beam Melting (EBM), Laser Engineered Net Shaping (LENS), and Direct Metal Deposition (DMD). Optionally, the additive manufacturing process may be used make the unitary, one-piece, or monolithic structure from more than one material or more than one metal alloy.

The compressor casing 34 supports a number of stator rows of circumferentially-spaced, stationary airfoil-shaped stator vanes 52. The stator vanes 52 of each stator vane row extend inward from the flowpath surface 38. Typically, one stator row is positioned immediately downstream of each blade row.

Some or all of the stator vanes 52 may be formed as part of a casing wall 36 as a single unitary, one-piece, or monolithic component. This configuration is illustrated in FIG. 3. The stator vanes 52 may have a uniform vane-to-vane spacing about the circumference of the compressor casing 34 or the vane-to-vane spacing may be non-uniform. Nonuniform spacing is facilitated, because the unitary, one-piece, or monolithic construction avoids practical limitations on non-uniform spacing when using separate vanes, such as an increased number of unique parts or risks of assembly errors.

The compressor casing 34 includes one or more annular, radially-extending flanges. One example flange is labeled 54 in FIG. 3 for reference. The flanges serve purposes such as structural stiffening, provision of thermal mass, and/or providing for mechanical attachments.

Each casing wall 36 may include, as part of the unitary whole, one or more structures that function to enhance the performance of the compressor casing 34, such as by reducing its weight, improving its thermal response characteristics, reducing its parts count, and/or improving bleed air extraction efficiency. These structures have in common at least one portion protruding from surrounding areas of the outboard surface 40 of the casing wall 36, as well as at least one hollow cavity formed in the casing wall 36. These may be referred to generally herein as "hollow structures".

The compressor casing 34 may include one or more heat shields. Generally, heat shields are thin structures which define a barrier or enclosure that surrounds a portion of another structure and is spaced-away from the associated structure.

In the illustrated example, the compressor casing 34 includes a heat shield 56 which surrounds the flange 54. The heat shield 56 is an arcuate or annular structure (it may be a segmented annulus). It has a relatively small wall thickness which is generally substantially less than the average wall thickness "T1" of the casing wall 36. Its shape is generally a "U" or "V" with radial legs 58 interconnected by an axial leg 60 (as viewed in half-section). Inboard ends of the radial legs 58 join the remainder of the casing wall 36 at integral connections. The heat shield 56 at least partially surrounds the associated flange 54 and generally conforms to the cross-sectional shape of the flange 54. Accordingly, both the flange 54 and the surrounding heatshield 56 may be described as "protruding" from the surrounding portions of the outboard surface 40 of the casing wall 36. A hollow chamber 62 is defined between the flange 54 and the heat shield 56 and serves as a thermally-insulating gap. Optionally, a hollow chamber (not shown) may be defined within the flange 54.

Each of the heat shields 56 is an example of a "hollow structure" as that term is used herein.

Figure 5:
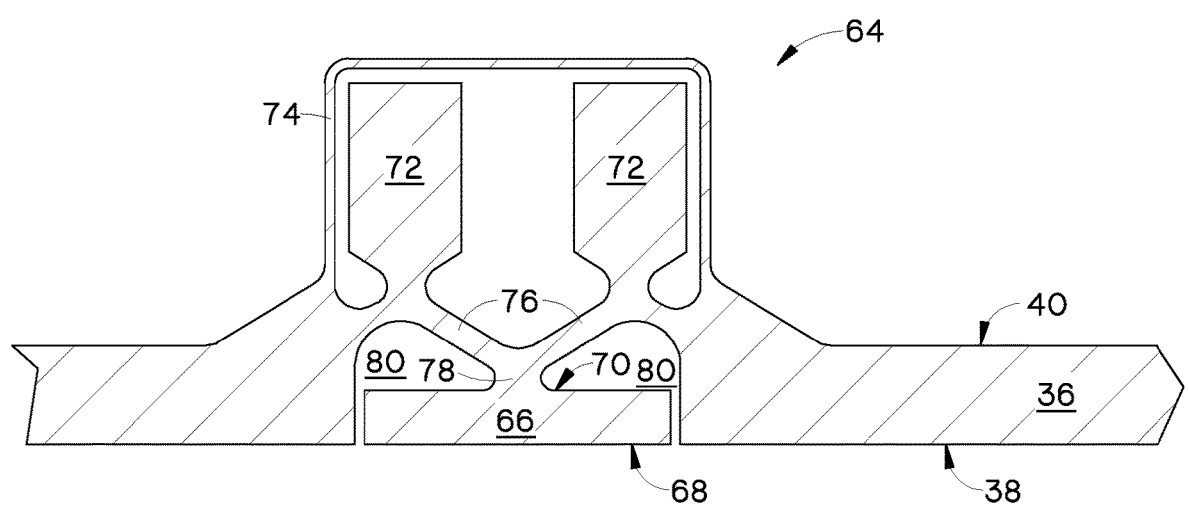
FIG. 5 is an enlarged view of a portion of FIG. 3.

The compressor casing 34 may include one or more compliant tip shroud assemblies 64. Referring to FIG. 5, a portion of the casing wall 36 adjacent the flowpath side 38 is formed into an arcuate shroud 66 having a flowpath side 68, which is configured to closely surround the rotor blades 32, and a backside 70. A pair of spaced-apart flanges 72 protrude from the outboard side 40 of the casing wall 36. They may optionally be surrounded with a heat shield 74 similar to heat shield 56 described above. The number of flanges may optionally be one or more than two.

The backside 70 of the shroud 66 is connected to the flanges 72 and/or the surrounding portion of the casing wall 36 with one or more ligaments or beams 76 that function as resilient spring elements. By this is it meant that their shape, size, material composition, and location permits them to deflect under applied load and then return to a nominal position. It will be understood that there are other geometries that can serve as spring elements. The ligaments 76 join a central portion of the backside 70 of the shroud 66 at a relatively slender neck 78 which is flanked fore and aft by recesses 80.

In operation, the shroud 66 may move, pivot and/or translate in one or more directions in response to an applied load, such as contact by a compressor blade tip, commonly referred to as a "rub". For example, it may move radially outboard and/or pivot into one or both of the recesses 80. Upon removal of the applied load, the shroud 66 returns to a nominal position via restoring force from the beams 76. This property is referred to as the shroud 66 being "compliant". Collectively, the shroud 66, the flanges 72, and the ligaments 76 define the compliant tip shroud assembly 64. The compliant tip shroud assembly 64 is an example of a "hollow structure" as that term is used herein.

Referring back to FIG. 3, the compressor casing 34 may include a bleed slot 82 passing through the thickness of the casing wall 36. The bleed slot 82 may extend over all or a portion of the circumference of the compressor casing 34. In the illustrated example the single bleed slot 82 is a complete 360° slot. The bleed slot 82 defines an inlet 84 at the flowpath surface 38.

During engine operation a portion of the compressed air from the primary flowpath 86 of the engine 10 enters the bleed slot 82 through the inlet 84 and passes into a bleed cavity 88 defined in part by an annular outer wall 90 (e.g. part of a manifold or outer casing) surrounding the compressor casing 34. Air entering the bleed cavity 88 can be redirected or transported as necessary for various end uses by means of appropriate conduits, valves, etc. (not shown).

The bleed slot 82 extends along a slot axis 92 which is disposed at a non-parallel, non-perpendicular angle θ to the centerline axis 11 of the engine 10. More particularly, the angle θ may be selected to reduce pressure losses by turning bleed air through relatively low angle. As used herein, the term "low-angle" refers to an angle of about 65° or less. For example, the angle θ may lie in a range of about 30° to about 65°. In the illustrated example, the angle θ is about 37°.

In the illustrated example, a circumferential array of structural struts 94 are disposed within the bleed slot 82, with spaces therebetween. By appropriate selection of their thickness, the struts 94 function to improve the structural stiffness of the compressor casing 34, control the channel width between opposed channel surfaces, and may also control the throat area of the bleed slot 82. In addition to the low-angle orientation described above, the performance of the bleed slot 82 may be further improved by the shaping and orienting the struts 94 so they function as turning vanes, i.e. to reduce a tangential velocity (or tangential velocity component) of the flow, also referred to as "deswirling" the flow.

The bleed slot 82 is an example of a "hollow structure" as that term is used herein.

Figure 6:
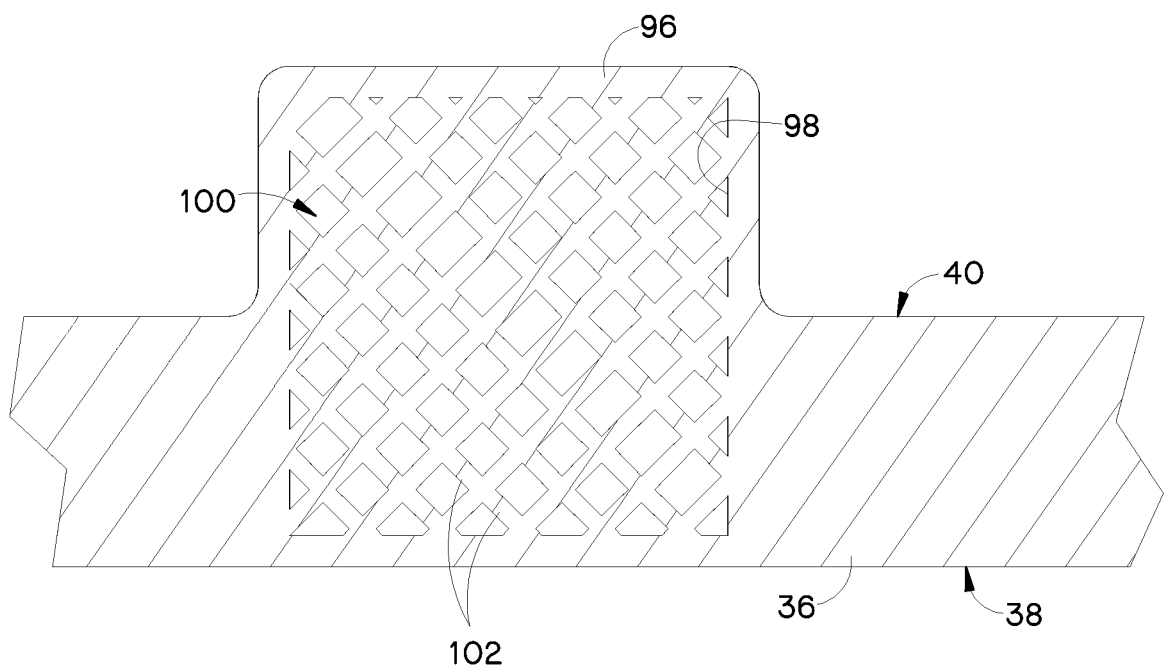
FIG. 6 is an enlarged view of a portion of FIG. 3.

The compressor casing 34 may include one or more hollow flanges. In the illustrated example, a portion of the casing wall 36 adjacent the flowpath side 38 protrudes from the outboard surface 40 to define a hollow flange 96 which includes a hollow interior chamber 98. As seen in FIG. 6, the interior chamber 98 includes a lattice structure 100. The lattice structure 100 may comprise a plurality of internal beams 102. In the illustrated example, the beams 102 are arranged in a grid pattern of intersecting parallel rows. The configuration of the beams 102 may be tailored to suit a specific application. By this is it meant that their shape, size, material composition, and location may be selected to result in specific mechanical and/or thermal properties. For example, suitable configuration of the beams 102 may result in the hollow flange 96 having a lower effective coefficient of thermal expansion than a beam of the same material composition and cross-section shape made from solid material.

The hollow flange 96 is one example of a "hollow structure" as that term is used herein.

The stator structure described herein has advantages over the prior art. It can provide a specific fuel consumption ("SFC") benefit by enabling reduced clearances and potential to move bleed stage forward). It can provide a cost reduction by reducing parts count and assembly labor. Integrating the stator vanes into the casing allows a more tailored approach to nonuniform vane spacing for aeromechanical benefit to adjacent rotor stages that could allow the use of more aerodynamic rotor airfoil geometries for reduced fuel consumption. Such integration can reduce engine weight by eliminating redundancy of the fixed stator vane outer flowpath and retention features associated with separable stator vanes, reducing engine length otherwise required to package those retention features, and reducing the total number of fasteners with reduction of the number of circumferential bolted joints and integration of heat shields.

Combining the integrated design with additive manufacturing improves the ability to employ clearance control features that are tailored to the unique casing and rotor growth combinations. Compared to conventional approaches, the use of additive methods to manufacture the stator structure would also allow tighter bleed offtake throats or adding bleed vanes with more aerodynamic diffusion instead of simple struts between the inner and outer flow surfaces. It enables this more effective bleed geometry within less engine axial length, and with more effective integration of the bleed geometry into the thermal control structure for blade tip clearance matching than could be achieved with conventional manufacturing. Together, sufficient secondary air bleed static pressure increase could allow bleed extraction from an earlier compressor stage, thereby at overall lower engine fuel consumption. The use of additive manufacturing allows a compliant blade tip shroud to be integrated into the casing for lower air leakage, less flowpath geometry tolerance stack-up (tighter clearances) and avoidance of wear at separable interfaces with the casing.

The foregoing has described a stator structure for a gas turbine engine. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

Further aspects of the invention are provided by the subject matter of the following numbered clauses:

1. A turbomachinery stator apparatus, comprising: a compressor casing including a casing wall defining an arcuate flowpath surface and an opposed backside surface, the flowpath surface defining at least two spaced-apart rotor lands; and a stator vane row of stator vanes disposed inside the compressor casing; wherein the casing wall includes at least one hollow structure; and wherein the casing wall is a single monolithic whole, wherein the stator vanes are integrally formed as part of the monolithic whole.

2. The apparatus of any preceding clause wherein the compressor casing includes a plurality of the casing walls joined together to define a fully annular structure.

3. The apparatus of any preceding clause where the casing wall is a fully annular structure.

4. The apparatus of any preceding clause wherein the compressor casing comprises different materials at different locations.

5. The apparatus of any preceding clause wherein the casing wall includes: a bleed slot passing through the casing wall, the bleed slot having an inlet, the bleed slot extending along a slot axis; and an array of struts disposed the bleed slot, wherein the bleed slot is integrally formed as part of the monolithic whole.

6. The apparatus of any preceding clause wherein the slot axis is disposed at an angle of about 65° or less relative to a centerline axis of the casing wall.

7. The apparatus of any preceding clause wherein the casing wall includes a compliant tip shroud, wherein the compliant tip shroud is integrally formed as part of the monolithic whole.

8. The apparatus of any preceding clause wherein the casing wall includes a heat shield, wherein the heat shield is integrally formed as part of the monolithic whole.

9. The apparatus of any preceding clause wherein the casing wall includes an annular hollow flange having an internal lattice structure, wherein the hollow flange is integrally formed as part of the monolithic whole.

10. The apparatus of any preceding clause wherein the stator vanes have a nonuniform spacing about the circumference of the casing.

11. A gas turbine engine apparatus, comprising: a compressor, a combustor, and a turbine arranged in serial flow relationship, wherein the compressor includes: a compressor casing including a casing wall defining an arcuate flowpath surface and an opposed backside surface, the flowpath surface defining at least two spaced-apart rotor lands; wherein the casing wall includes at least one hollow structure; and wherein the casing wall is a single monolithic whole; at least one row of stator vanes disposed inside the compressor casing, wherein the stator vanes are integrally formed as part of the monolithic whole; and at least one row of rotor blades mounted for rotation about a centerline axis inside the compressor casing, and mechanically coupled to the turbine.

12. The apparatus of any preceding clause wherein the compressor casing includes a plurality of the casing walls joined together to define a fully annular structure.

13. The apparatus of any preceding clause where the casing wall is a fully annular structure.

14. The apparatus of any preceding clause wherein the compressor casing comprises different materials at different locations.

15. The apparatus of any preceding clause wherein the casing wall includes: a bleed slot passing through the casing wall, the bleed slot having an inlet, the bleed slot extending along a slot axis; and an array of struts disposed the bleed slot, wherein the bleed slot is integrally formed as part of the monolithic whole.

16. The apparatus of any preceding clause wherein the slot axis is disposed at an angle of about 65° or less relative to a centerline axis of the casing wall.

17. The apparatus of any preceding clause wherein the casing wall includes a compliant tip shroud, wherein the compliant tip shroud is integrally formed as part of the monolithic whole.

18. The apparatus of any preceding clause wherein the casing wall includes a heat shield, wherein the heat shield is integrally formed as part of the monolithic whole.

19. The apparatus of any preceding clause wherein the casing wall includes an annular hollow flange having an internal lattice structure, wherein the hollow flange is integrally formed as part of the monolithic whole.

20. The apparatus of any preceding clause wherein the stator vanes have a nonuniform spacing about the circumference of the casing.

What is claimed is:

1. A turbomachinery stator apparatus, comprising:
a compressor casing including a casing wall defining an arcuate flowpath surface and an opposed backside surface, the flowpath surface defining at least two spaced-apart rotor lands; and
a stator vane row of stator vanes disposed inside the compressor casing;
wherein the casing wall includes a compliant tip shroud positioned outboard of the rotor lands immediately upstream or downstream of the stator vane row;
wherein a) the casing wall including the compliant tip shroud and b) the stator vanes form a single monolithic whole;
wherein the compliant tip shroud comprises a shroud portion having a slender neck portion connecting the shroud portion to at least two beams configured to be resilient spring elements;
said at least two beams being further connected to i) a pair of spaced apart flanges that protrude from the outboard side of the casing wall and ii) the casing wall.

2. The apparatus of claim 1 wherein the compressor casing includes a plurality of casing walls joined together to define a fully annular structure.

3. The apparatus of claim 1 where the casing wall is a fully annular structure.

4. The apparatus of claim 1 wherein the compressor casing comprises different materials at different locations.

5. The apparatus of claim 1 wherein the casing wall includes at least one hollow structure, wherein the at least one hollow structure includes:
a bleed slot, the bleed slot passing through the casing wall, the bleed slot having an inlet, the bleed slot extending along a slot axis; and
an array of struts is disposed within the bleed slot, wherein the bleed slot is integrally formed as part of the monolithic whole.

6. The apparatus of claim 5 wherein the slot axis is disposed at an angle of about 65° or less relative to a centerline axis of the casing wall.

7. The apparatus of claim 1 wherein the compliant tip shroud is a hollow structure.

8. The apparatus of claim 1 wherein the compliant tip shroud is integrally formed as part of the monolithic whole via additive manufacturing.

9. The apparatus of claim 1 wherein the casing wall further includes an annular hollow flange having an internal lattice structure.

10. The apparatus of claim 1 wherein the stator vanes have a nonuniform spacing about the circumference of the casing.

11. A gas turbine engine apparatus, comprising:
  a compressor, a combustor, and a turbine arranged in serial flow relationship, wherein the compressor includes:
    a compressor casing including a casing wall defining an arcuate flowpath surface and an opposed backside surface, the flowpath surface defining at least two spaced-apart rotor lands;
    wherein the casing wall includes a compliant tip shroud;
    wherein the casing wall including the compliant tip shroud forms a single monolithic whole;
  at least one row of stator vanes disposed inside the compressor casing, wherein the stator vanes are integrally formed as part of the monolithic whole; and
  at least one row of rotor blades mounted for rotation about a centerline axis inside the compressor casing, and mechanically coupled to the turbine;
  wherein the compliant tip shroud comprises a shroud portion having a slender neck portion connecting the shroud portion to at least two beams configured to be resilient spring elements;
  said at least two beams being further connected to both a pair of spaced apart flanges that protrude from the outboard side of the casing wall and the casing wall.

12. The apparatus of claim 11 wherein the compressor casing includes a plurality of casing walls joined together to define a fully annular structure.

13. The apparatus of claim 11 where the casing wall is a fully annular structure.

14. The apparatus of claim 11 wherein the compressor casing comprises different materials at different locations.

15. The apparatus of claim 11 wherein the casing wall includes at least one hollow structure, wherein the at least one hollow structure includes:
  a bleed slot, the bleed slot passing through the casing wall, the bleed slot having an inlet, the bleed slot extending along a slot axis; and
  an array of struts is disposed within the bleed slot, wherein the bleed slot is integrally formed as part of the monolithic whole.

16. The apparatus of claim 15 wherein the slot axis is disposed at an angle of about 65° or less relative to the centerline axis of the casing wall.

17. The apparatus of claim 1 wherein the compliant tip shroud is a hollow structure.

18. The apparatus of claim 1 wherein the compliant tip shroud is integrally formed as part of the monolithic whole via additive manufacturing.

19. The apparatus of claim 1 wherein the casing wall further includes an annular hollow flange having an internal lattice structure.

20. The apparatus of claim 11 wherein the stator vanes have a nonuniform spacing about the circumference of the casing.

* * * * *